(12) United States Patent
Hombach et al.

(10) Patent No.: US 8,621,953 B2
(45) Date of Patent: Jan. 7, 2014

(54) DELTA ROBOT HAVING SPECIAL ARRANGEMENT OF THE BALL JOINTS

(76) Inventors: Christian Hombach, Güntersleben (DE); Felix Böttcher, Höchberg (DE)

( * ) Notice: Subject to any disclaimer, the term of this patent is extended or adjusted under 35 U.S.C. 154(b) by 257 days.

(21) Appl. No.: 13/141,056

(22) PCT Filed: Dec. 16, 2009

(86) PCT No.: PCT/DE2009/001772
§ 371 (c)(1),
(2), (4) Date: Jul. 15, 2011

(87) PCT Pub. No.: WO2010/069298
PCT Pub. Date: Jun. 24, 2010

(65) Prior Publication Data
US 2011/0259138 A1  Oct. 27, 2011

(30) Foreign Application Priority Data
Dec. 19, 2008  (DE) .......................... 10 2008 063 869

(51) Int. Cl.
*B25J 17/00* (2006.01)
*B25J 17/02* (2006.01)
*B25J 18/00* (2006.01)

(52) U.S. Cl.
USPC ........................................ 74/490.01; 901/28

(58) Field of Classification Search
USPC ........ 74/490.01, 490.05; 901/28, 29; 403/122
See application file for complete search history.

(56) References Cited

U.S. PATENT DOCUMENTS

| | | | |
|---|---|---|---|
| 5,333,514 A | 8/1994 | Toyama et al. | |
| 6,419,211 B1 | 7/2002 | Hvittfeldt et al. | |
| 6,431,019 B1 * | 8/2002 | Greene et al. | 74/490.05 |
| 7,935,136 B2 * | 5/2011 | Alamin et al. | 606/279 |
| 2006/0182602 A1 * | 8/2006 | Schuler et al. | 414/735 |
| 2010/0037721 A1 * | 2/2010 | Nakao et al. | 74/490.05 |

FOREIGN PATENT DOCUMENTS

EP  2116339 A1  11/2009

* cited by examiner

*Primary Examiner* — Justin Krause
(74) *Attorney, Agent, or Firm* — Edwin D. Schindler

(57) ABSTRACT

A delta robot includes a base plate and at least three drives fastened thereon, which are connected to an arm, with at least one drive connected at an opposite end relative to the arm to two rods. The rods run parallel and are connected at one end by an additional ball joint to a movable parallel plate. The two ball joints are oriented mirror-symmetrically to each other and each hollow ball segment is pressed onto a ball segment head by tensioning a permanently elastic element between two rods that are parallel to each other. The center point of a ball segment head is displaced relative to the longitudinal support axis of the rod with the direction of displacement pointing away from the hollow ball segment with the displacement always being smaller than the radius of the spherical segment head.

14 Claims, 2 Drawing Sheets

DELTA ROBOT HAVING SPECIAL ARRANGEMENT OF THE BALL JOINTS

BACKGROUND OF THE INVENTION

1. Technical Field of the Invention

Figure 1:
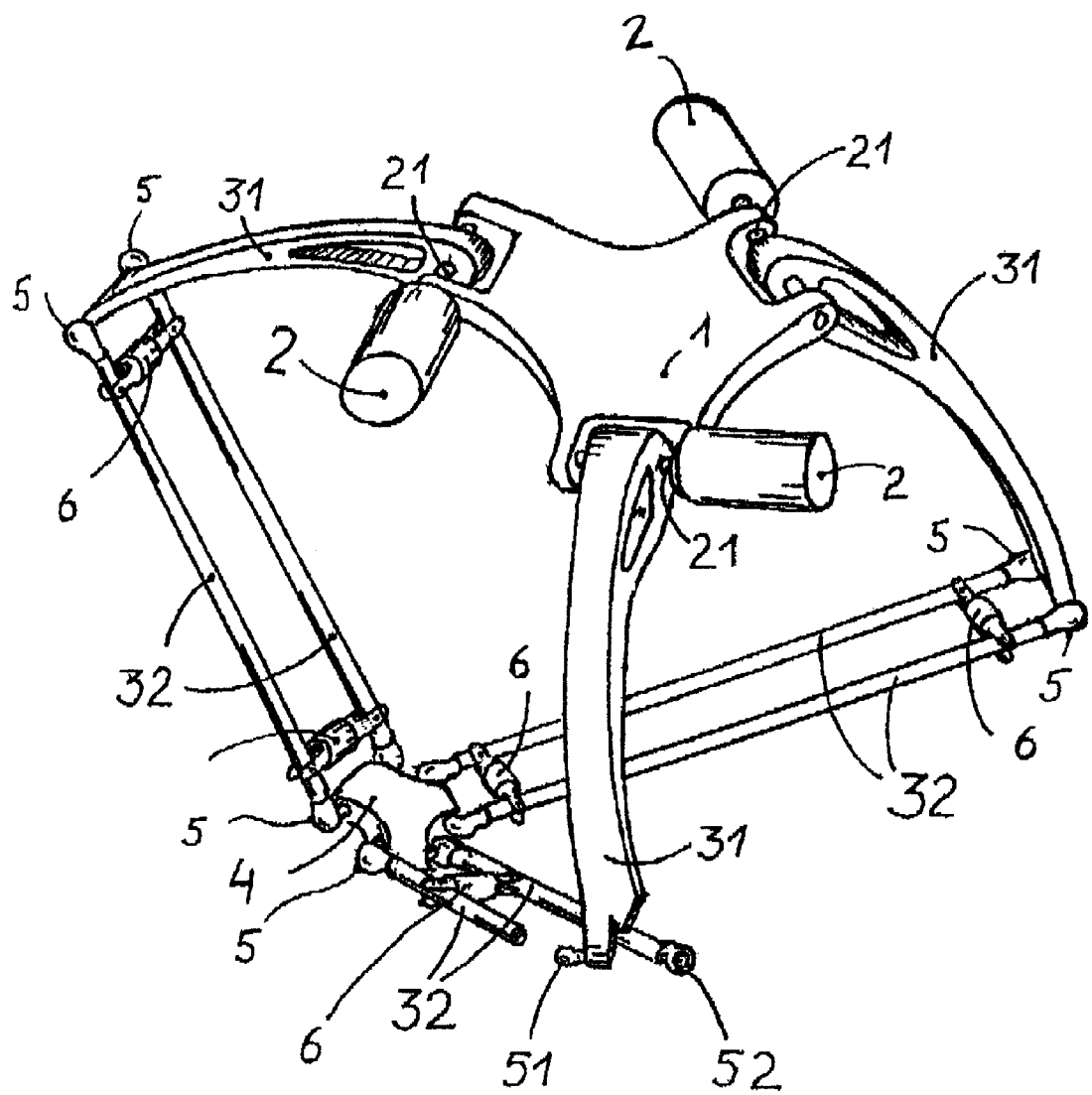

The invention relates to a delta robot, comprising a stationary base plate and at least three drives fastened thereon, which are in each case connected to at least one arm, of which at least one is connected at the other end thereof to two rods by way of a ball joint, said rods running parallel to each other and at the other end thereof being connected, via a further ball joint, to a movable parallel plate, wherein each ball joint has a ball segment head and a hollow ball segment designed complementary thereto, and the two ball joints, which adjoin each other on parallel rods, are oriented mirror-symmetrically to each other, and each hollow ball segment is pressed onto the associated ball segment head by tensioning at least one permanently elastic element between two rods that are parallel to each other.

2. Description of the Prior Art

In the prior art, delta robots have proven their worth in particular for packaging lightweight foods, since they permit extremely high dynamics of up to three packaging operations per second.

The first delta robots had three arms. However, variants with four and more arms are known.

In the prior art, most delta robots consist of a base plate on which three servo drives are mounted. At the drive shaft thereof, an arm—also known as upper arm—is attached, on which, as lower arm, two parallel rods are pivotably mount, which in turn are in pivotable connection with the parallel plate. By a swivelling of the servo drives, the parallel plate can be manoeuvred into any desired position of the available work space. Because the underarms consist of two parallel rods, the parallel plate thus always moves—as its name suggests—parallel to the base plate.

In principle, a universal joint or cardan joint can be used for the articulated connection of the rods to the arms and to the parallel plate. The maximum pivoting angles that can thereby be achieved, however, are significantly lower in comparison to a ball joint, consisting of a ball segment head and a complementary hollow ball segment sliding thereon. Because ball joints thus have a larger pivot angle and thereby permit a larger working space, they are now the joint design most used for delta robots.

In the prior art, the U.S. Pat. No. 5,333,514, Osamu Toyama, discloses a delta robot, the lower arm of which consists of parallel rod pairs, at the ends of which hollow ball segments, also designated ball sockets or ball cups, are arranged, and are pressed onto the ball segment heads on the arm or on the parallel plate in that the ends of the two parallel rod-shaped lower arms are held together by tensioning springs. The hollow ball segment then moves on the ball head in the manner of a sliding bearing. A considerable advantage of this bearing is that a similar contact area is produced at every angle.

The various depictions of the rods in U.S. Pat. No. 5,333,514 show the same width from all points of view, from which it follows that the rods have a round cross-section. In FIG. 5 of the patent, it can be seen that the rods are a thin-walled tube.

There, it is also shown that the opening surfaces of the hollow ball segments of the ball joints are oriented in an extension of the centre axis.

However, from this arrangement—which is typical in the prior art—it emerges as the major disadvantage that the rods are asymmetrically loaded, and therefore can easily bend, as is explained below: In a tube, the centre axis is also the longitudinal support axis. If a force acts in the direction of this longitudinal support axis, then the tube is precisely symmetrically loaded and the forces are distributed to all regions of the tube wall and the maximum of the load bearing capacity of the tube is achieved.

However, as soon as the loading migrates from the longitudinal support axle, part of the tube wall is more strongly loaded than the other parts, and collapses, although the maximum load-bearing strength of the tube has not yet been reached.

Since, in a ball joint, the forces are distributed beyond the contact surface, in the aforementioned arrangement, compresses forces that are introduced, via a ball head and the associated hollow ball segment, into a road are disadvantageously not transmitted into the longitudinal support axis, but outside thereof. Therefore, on that side at which the hollow ball segment is arranged, the tube will collapse already at compressive loads that lie below the maximum load-bearing capacity of the tube.

SUMMARY OF THE INVENTION

Against this background, it is the object of the invention, in a delta robot, to arrange the connection between a ball joint and a rod of the lower arm, such that tensile or compressive forces are distributed uniformly on the rod and do not load it with additional bending moments, so that its load-bearing capacity is exploited to the full extent.

As solution, the invention proposes that the centre of at least one ball segment head is arranged displaced with respect to the longitudinal support axis of the rod connected to the ball joint, and the direction of displacement points centrally away from the hollow ball segment and the amount of the displacement is smaller than the radius of the ball segment head.

The advantages and significant features of the invention are illustrated on the practical example of a rod in the form of a tube, because that is a very widely used configuration for delta robots, and can also be comparatively simply explained. It is easy to understand the longitudinal support axis for a tube is the centre axis, since when a tube is loaded with a force precisely in the direction of the centre axis, the forces are uniformly distributed in the wall of the tube.

The gist of the invention is therefore to ensure that the tensile or compressive force exerted from the ball joint on the rod is also directed in the direction of the longitudinal support axis.

To transfer the force from the ball segment head to the rod, a hollow ball segment is used. In the prior art, it was assumed that the resulting force, which the hollow ball segments exerts in the longitudinal direction on the rod bears is applied at the front edge of the opening of hollow ball segment.

On a precise consideration of the force distribution, however, it becomes clear that this assumption is not correct. The force in a ball joint is rather distributed over the surface. The resulting force vector of all the forces acting from the hollow ball segment in the longitudinal direction of the rod therefore continues to lie in the interior of the hollow ball segment.

The gist of the invention is therefore to displace the hollow ball segment with respect to the longitudinal axis of the rod to the extent that the resulting force of the hollow ball segment is shifted into the longitudinal support axis. To this end the hollow ball segment must be displaced with respect to the longitudinal axis of the rod in a direction that points centrally through the hollow ball segment. The amount of the displacement is always less than the radius of the ball segment head.

It is readily apparent that a displacement by the entire amount of the radius does not provide an improvement In the sense of the object of the invention, but only transfers the unevenness of the force distribution to the opposite side of the wall of the tube. The optimum lies in between, that is to say at an amount of the displacement that is greater than zero and smaller than the radius of the ball segment head. An improvement is already achieved when the amount of the displacement is greater than ¼ and smaller than ¾ of the radius of the ball segment head.

For calculating the sum vector of all components of the tensile and compressive forces oriented parallel to the longitudinal support axis of the rod, the curve must be used, on which those components of the tensile and compressive forces running in the direction of the longitudinal support axis are plotted against a radius running perpendicular to the aforementioned longitudinal support axis. The force distribution over that radius of the hollow sphere that runs through the centre of its opening and perpendicular to the longitudinal axis of the rod that it is connected to is also relevant. This force distribution can also be represented by a force distribution curve. The centroid of the area beneath this force distribution curve lies on that point of the radius at which the sum of all force vectors would have the same effect as when a single force vector acted in this point.

This is the amount by which the centre of the hollow ball segment must be displaced with respect to the longitudinal support axis if it is to be optimized for the components of the compressive and tensile forces acting in the longitudinal direction.

The longitudinal support axis in the case of a cylindrical or hollow cylindrical rod is its centre line, which is easy to comprehend, for which reason the explanations given above are based on the easy-to-explain example of a tubular rod.

In the most general case, however, the rod can also be of arbitrary shape, thus not having a uniform profile along its length. An example of such a form is similar to the thigh bone in the case of humans and animals, which has been shaped by evolution into an optimum ratio between material outlay and load-bearing strength. A similar form can be produced, for example, from aluminium foam and used as the lower arm of a robot. For this shape as for others, the longitudinal support axis is the connection of the centroids of all the cross-sections of the rod.

It is only in a further restriction that the rod has a uniform profile along the length. However, this profile must not necessarily be a tube but can also assume any other arbitrary shape.

Examples of suitable other profiles result from the tensioning spring, which in each case connects two adjacent rods and acts with high lateral forces on the rod, so that it is subject to bending moments. It is suitable to reinforce the rod by giving it, for example, the profile of a rectangle, an elongated polygon, an oval or an ellipse. The longitudinal axis of this profile should then point in the direction of the tensioning spring.

A suitable variant is that the opening area of the hollow ball segment is a plane that runs parallel to the longitudinal support axis. Then the transfer of the tensile forces to the hollow ball segment behaves in the same way as the transfer of the compressive forces.

The hollow ball segment preferably comprises the ball segment head—with respect to the centre—at an angle of 180°. In this case, the laterally occurring forces are lowest and therefore the bending load of the rods is also minimized.

However, in another variant it is also possible that the encompassing angle is less than 180°. An advantage of this configuration is that the pivot angle of the ball joint. Another advantage is the function as overload protection: As of a force limit determined by the force of the permanently elastic elements for holding together two adjacent ball joints, the hollow ball segments jump off the ball segment heads. As a result, the arms and gears in the drive are effectively protected against damage. It must also be taken into account that the laterally acting force components become greater.

In another variant, the hollow ball segment has two openings, which lie opposite one another, such that the ball segment head is then enclosed in an annular manner. The advantage of this configuration is that the resulting force application point only displaces a little, even with loads increasing in pulses, and therefore permits even greater exploitation of the maximum load-bearing strength of the rod. This configuration could also be appropriate in particular for delta robots with very high short-term overloading.

Another advantage is that the necessary force of the permanently elastic element is minimized. By virtue of the ball joints on the arms at both sides, only forces in the arm direction and against the spring force can be transmitted. Forces against the springs are caused by the mass inertias in the case of acceleration processes and by the normal forces occurring on the wall of the hollow ball segment. By virtue of the annular recess, that region of the surface is removed that would generate the greatest transverse forces.

It has proven suitable in the case of delta robots for a long time to provide the inner surface of the hollow ball segment and/or the surface of the associated ball segment head with a layer of elastic and very slidable plastic. In an efficient embodiment, a hollow-spherical plastic insert is fastened in the hollow ball segment.

The example from the prior art mentioned at the outset has a hollow ball segment at the ends of the rod. In this case, a complementary ball segment head in each case is mounted on the arms and on the parallel plate.

The example of the thigh bone shows that an inverse combination is also possible, that is to day the ball heads are formed on the rods and complementary hollow ball segments are formed in the arms and in the parallel plate.

In contrast to the above-mentioned bone-like form with a non-uniform profile over the length of the rod, which must be cast or machined from the solid, the rods of the delta robot, in practice, will usually have a uniform profile along their length, because the profiles can be produced easily by extrusion or folding or rolling of sheet metals. A shape that is appropriate both in terms of manufacturing technology and statics is a tube.

Independently of the form, a wide variety of materials can be used for the rods. Glass fibre-reinforced plastics (GRP) have been known for some time. In the state of the art, carbon-fibre-reinforced plastics (CRP) are most widespread. In principle, other admixtures in plastics or other plastics are also conceivable. As material for the rods, formed sheet metal or metal foam, such as foamed aluminium, have already been mentioned.

As variant, it is conceivable that the metal foam is foamed in a mould that not only contains the surface of the rod but also the ball head connected thereto. In this case, the outer skin of the foamed, one-piece part is homogeneous and therefore harder and more durable than the interior, which is made lighter by numerous cavities without sacrificing its load-bearing strength too much.

The limitation of this manufacturing method is the outlay for manufacturing the mould and the casting, so that this variant is interesting in particular for larger quantities.

A very much lower outlay for the production of the individual rod is required by metal tubes, since they are available in the most varied dimensions, wall thicknesses and materials. The production of the lower arms from metal tube is therefore comparatively very cost effective even for very small quantities.

An inherent disadvantage of metal tubes in comparison to tubes of CRP with the same load-bearing strength is the higher weight of the metal tubes. The weight influences mass moment of inertia with the fourth power of the effective pivot radius and therefore the achievable dynamics of the robot.

In comparison to previous arrangements, however, the metal tube can, as a result of the arrangement according to the invention of the ball segment, be made so much lighter that this disadvantage with respect to CRP is compensated. For the same dynamics, the delta robot, despite a thinner wall thickness of its lower arms, can carry the same maximum payload.

In principle, it is not out of the question to use bamboo tube, wood and/or another natural material, as material for the rods. Conceivable application possibilities are, e.g., wood-processing machinery. In these cases, too, an arrangement according to the invention of the ball joint with respect to the longitudinal support axis ensures uniform loading of the rods and therefore better utilization of its maximum load bearing strength.

As a further variant in the interests of the object of further reducing the flexural loading of the rods, it is appropriate to further extend a hollow spherical segment with 180° enclosure of the ball segment head by means of a hollow cylinder with the same internal radius. Although this hollow cylinder limits the maximum possible pivot angle of the ball joint somewhat, it avoids a "lateral sliding off" of the two rods with respect to one another. By this means, the flexural loading of the rod is further reduced.

In the prior art, the permanently elastic elements—such as springs—which keep the hollow ball segments on the ball head segments were always articulated in the centre of a round or tubular rod. Since, with an arrangement of round rods according to the invention, their centre axis no longer connects the centre points of the ball head segments but is arranged outside this line, the springs would no longer lie on the line between the centres of rotation of the ball head segments.

However that would have the consequence that, on pivoting of the rods, the distance between the articulation points of the springs would change so that the springs would have to expand and contract repeatedly, which, in view of the large number of load cycles of a delta robot, would lead to premature rupture of the springs necks.

The invention therefore proposes that the pivot axes of the permanently elastic elements are arranged on a straight connecting line between the centres of rotation of the two ball joints at both ends of the respective rod. They are therefore arranged outside the centre line of the rods.

The springs, which tension the two parallel-guiding rods to one another, are a source of bending moments that act on the rods. According to the prior art, only one spring in each case is arranged in the vicinity of each ball joint. Alternatively, it is proposed to extend the rod beyond the ball joint and also to arrange another tensioning spring on the other side of the ball joint. If these two tensioning springs have approximately the same characteristics, no bending movements occur, as a result, which are transmitted into the rod and can contribute to a bending of the rod in its centre between the two ball joints.

BRIEF DESCRIPTION OF THE DRAWING FIGURES

Further details and features of the invention are described below with reference to an example. This is not intended to restrict the invention, but only to explain it. In schematic view, FIG. 1 shows a perspective view of a delta robot
FIG. 2 shows a section through a ball joint.

DETAILED DESCRIPTION OF THE DRAWING FIGURE AND PREFERRED EMBODIMENTS

Figure 2:
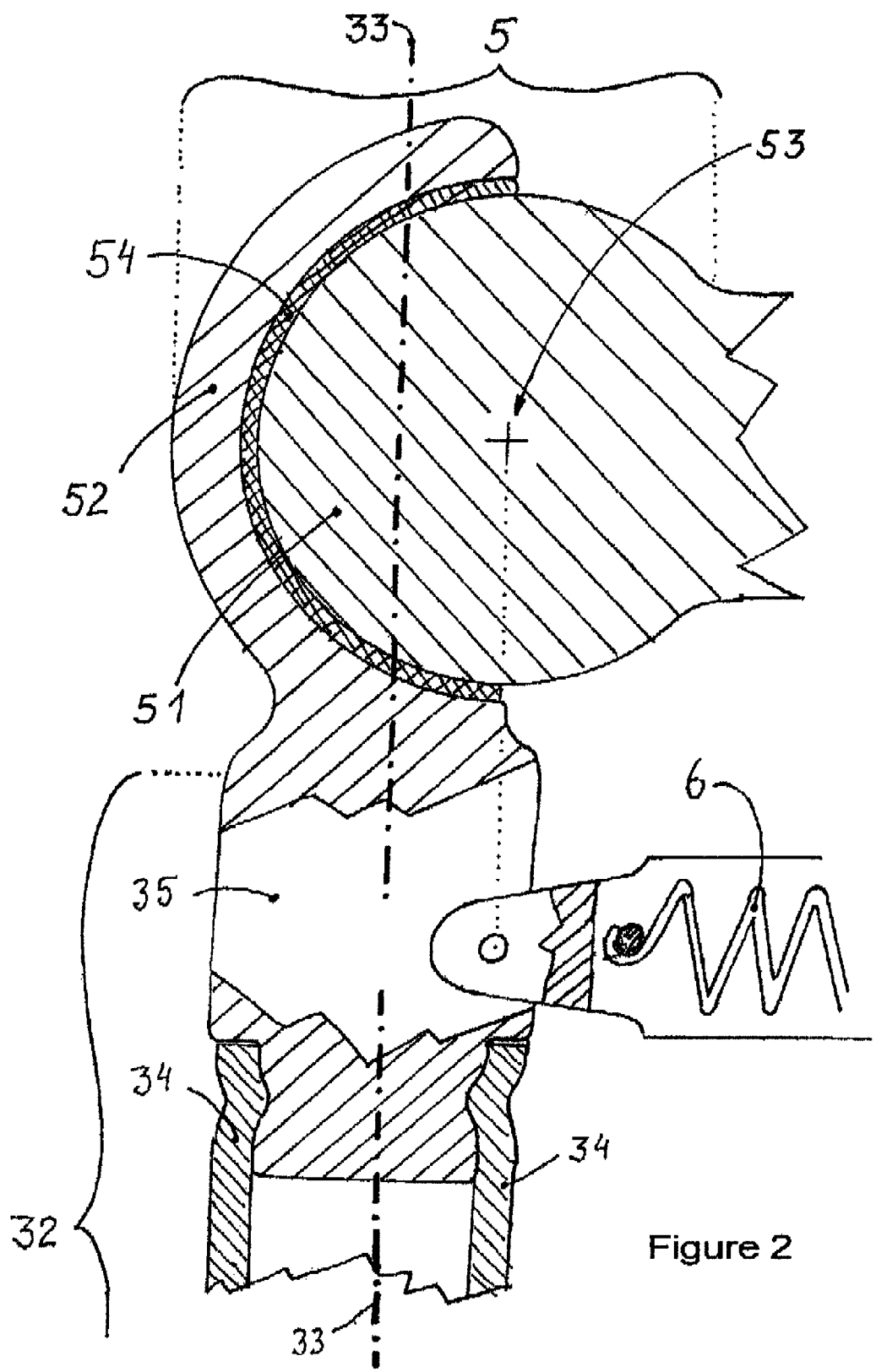

FIG. 1 shows the schematic diagram of a delta robot according to the invention with tensile-spring-stabilized rods 32. At the upper edge of the drawing, the base plate 1 with its three approximately fork-shaped receptacles for the arms 31 and the servo drives 2 can be seen, which, via their drive shaft 21, move the arms 31 like a crank. At the ends of each arm 31, one pair of rods 32 in each case is connected via ball joints 5. Also via ball joints 5, this pair of rods 32 is again connected to the parallel plate 4.

The parallel plate 4 therefore always remains parallel to the stationary base plate 1, independently of in which positions of the achievable pivot space of the delta robot it moves.

On the parallel plate 4, a good pickup, a tool, a sensor, such as a camera, or another object can be fixed, which determines the actual activity of the delta robot, and is moved by it into the particular desired position.

In FIG. 1, it is shown how each pair of rods 32 is held together at the upper and lower end by a permanently elastic element 6. It is only in the case of the arm 31 that faces forward in FIG. 1 that the connection to the rods 32 actually attached thereto is broken in the drawing. By this means, on the right-hand side, the hollow ball segment 52 is visible, which, in this perspective, allows a view into its hemispherical depression. This socket-like depression is complementary in shape to the ball segment head 51. One such is visible at the left-hand side of the arm 31 at the front in the drawing, because the rod 32 actually connected thereto is cutaway in the drawing.

For the sake of clarity, in FIG. 1, the permanently elastic element 6 is omitted at the upper ends of the two forward-facing rods 32. In FIG. 1, it is clear that the tensioning springs 6 in each case press a pair of rods 32, with the hollow ball segments 52 fastened thereon, onto the ball segment heads 51, and in this manner ensure the functioning of the ball joints 5. It is also clear that, for a relatively high tensile force of the tensioning springs 6, the hollow ball segments 51 always in full-area contact with the associated ball segment head 51.

FIG. 2 shows a section through a ball joint 5. The ball segment head 51 encloses the hollow ball segment 52 with an enclosing angle of approx. 180°, a plastic layer 54 separating the two elements from one another, and the coefficients of static and dynamic friction between the hollow ball and ball segment being considerably improved.

The ball segment head 51 is fixed on an arm 31—not shown here—or on the parallel plate 4—which is also not shown here.

The hollow ball segment 52 merges into the rod 32. In the exemplary embodiment, this consists of a massive attachment 54 and a hollow cylinder 34, such as a sheet metal tube, plugged thereon. In the section of FIG. 1, it can be seen that the sheet metal tube 34, is pressed from both sides into notches of the attachment 35, and is therefore protected against tensile, compressive and flexural forces. This connection can be produced, for example, by magnetic pulse forming.

In the exemplary embodiment of FIG. 2, a permanently elastic element 6 engages on the attachment 35 of the rod 32. In FIG. 2, it can readily be seen that the laterally acting force of the permanently elastic element 6 presses the hollow ball segment 52 against the ball segment head 51 in full-area contact, insofar as that end of the rod 32 shown here as broken off is to be considered unmovable, which is ensured by the fact that the rod 32, at its other end, also bears a hollow ball segment 52, which—as in FIG. 2—is pressed onto a complementary ball segment head. 51.

FIG. 2 shows, even at first glance, that the axis of rotation of the fastening of the permanently elastic element 6—e.g. a tensioning spring—is by no means arranged in the longitudinal support axis 33, but on a surface that connects the centre points of the two ball heads. In this arrangement of the articulated arrangement of the springs, it always retains its length, irrespective of the angular position of the two rods 32, which increases its lifetime.

FIG. 2 clearly illustrates the main feature of the invention, namely the distance between the centre 53 of the ball segment head 51 and the longitudinal support axis 33 of the rod 32.

In the case of a tube, the longitudinal support axis 33 is known to be identical to its centre axis. In FIG. 2, this axis is identified by a dash-dot-dash line.

In the prior art, this longitudinal support axis 33 would run through the centre 53 of the ball segment head 51. In the case of the invention, however, the longitudinal support axis 33 is displaced into the hollow ball segment 52.

In FIG. 2, it is readily apparent that the longitudinal support axis 33 thereby comes at least very close to the line along which the resulting force vector of all the force components that impinge on the inner face of the hollow ball segment 52 in a vertical direction runs. In FIG. 2, it is apparent that a tensile force that acts via the rod 32 on the hollow ball segment 52 is distributed uniformly on the inner side thereof and thereby generates a resulting force vector that runs outside the centre point 53 of the ball segment head 51:

Below the centre point 53, the force component that acts in the direction of the support line 33 is biggest; at the "same level" as the centre point 53, that is to say in the centre of the inner surface of the hollow ball segment 52 the force component in the direction of the longitudinal support axis 33 is equal to zero.

If all the force components parallel to the longitudinal support axis 33 are projected onto a line running perpendicular to the longitudinal support axis 33, then it is shown that they increase very strongly from the value of zero in the centre of the inner side of the hollow spherical segment, to well over 50% "half way" to the centre, and have risen to 100% when they reach the centre point 53. The location of the centroid of the area below this curve is the optimum distance for the longitudinal support axis 33 from the centre point 53. In this point—according to the object of the invention—the tensile force is namely very uniformly distributed over the rod 32, so that it can be loaded with the greatest possible tensile or compressive force.

LIST OF REFERENCE CHARACTERS

1 Base plate
2 Drives, at least three each on base plate 1
21 Drive shaft of a drive 2
31 Arm connected via drive shaft 21 or otherwise to drive 2
32 Rod, connects arm 31 to parallel plate 4, in each case in an articulated manner
33 Longitudinal support axis, connects the centroids of all cross-sections along the longitudinal axis of the rods 32
34 Hollow cylinder, part of rod 32
35 Attachment of rod 32
4 Parallel plate, on rods 32
5 Ball joint on rods 32
51 Ball segment head, part of ball joint 5
52 Hollow ball segment, complementary to ball segment head 51
53 Centre of rotation of a ball joint 5
54 Plastic layer, between ball segment head 51 and hollow ball segment 52
6 Permanently elastic element tensioned between two rods 32

The invention claimed is:

1. A delta robot, comprising:
   a stationary base plate;
   a movable parallel plate;
   at least three drives fastened onto said stationary base plate, each drive of said at least three drives being connected to at least one arm with at least one said arm being connected at a first end thereof via a first ball joint to rods running parallel to each other and at a second end thereof being connected to a second ball joint having said movable parallel plate, said first ball joint and said second ball joint each having a ball segment head and a hollow ball segment complementary thereto with said first ball joint and said second ball joint adjoining each other on said rods and being oriented mirror-symmetrically to each other, each said hollow ball segment being pressed onto an associated said ball segment head with at least one elastic element being tensioned between said rods,
   wherein a center point of at least one said ball segment head is displaceable relative to a longitudinal support axis of said rod that is connected to one said ball joint with a direction of displacement pointing away from said hollow ball segment and with an amount of displacement always being smaller than a radius of said ball segment head.

2. The delta robot according to claim 1, wherein said at least one elastic element is one of a spring, a rubber band and a plastic band.

3. The delta robot according to claim 1, wherein each said drive of said at least three drives is at least one of a rotating servo motor, a linear motor, a stepping motor, a hydraulic cylinder, a pneumatic cylinder and a piezo crystal.

4. The delta robot according to claim 1, wherein each said rod has a cross-section that changes along its length and the longitudinal support axis connects centroids of all cross-sections of each said rod to one another.

5. The delta robot according to claim 1, wherein the amount of displacement is greater than a quarter and smaller than three-quarters of the radius of said ball segment head.

6. The delta robot according to claim 1, wherein at least one said hollow ball segment has an opening area with there being in the opening area a plane extending parallel to the longitudinal support axis.

7. The delta robot according to claim 1, wherein one said hollow ball segment is located at said first end of at least one said rod.

8. The delta robot according to claim 1, wherein said rods have the same cross-sectional profile along their entire lengths.

9. The delta robot according to claim 1, wherein at least a majority portion of one said rod is comprised of a hollow cylinder.

10. The delta robot according to claim 1, wherein each said rod is made of one of glass fiber-reinforced plastic, carbon fiber-reinforced plastic, sheet metal, metal foam, bamboo tube and wood.

11. The delta robot according to claim 1, wherein each said rod has a corrosion-resistant stainless steel outer surface.

12. The delta robot according to claim 1, wherein each said hollow ball segment is extended by a hollow cylinder having the same internal radius.

13. The delta robot according to claim 1, wherein said at least one elastic element is pivotably fixed on said rods with at least one pivot axis arranged on a straight connecting line between centers of rotation of said first ball joint and said second ball joint at both end of said rods.

14. The delta robot according to claim 1, wherein one said hollow ball segment is located at said second end of at least one said rod.

\* \* \* \* \*